United States Patent [19]
Lambert

[11] Patent Number: 5,126,137
[45] Date of Patent: Jun. 30, 1992

[54] SMALL ANIMAL PROPHYLACTIC DENTIFRICE

[76] Inventor: William S. Lambert, 52 Tokalon Pl., Metairie, La. 70001

[21] Appl. No.: 536,704

[22] Filed: Jun. 12, 1990

[51] Int. Cl.$^5$ .............. A61K 6/00; A61K 7/16; A61H 7/00

[52] U.S. Cl. .................. 424/401; 424/49; 15/110; 15/167.1; 128/62 A

[58] Field of Search ............. 424/401, 49; 15/167.1, 15/110; 128/62 A

[56] References Cited

U.S. PATENT DOCUMENTS

| | | | |
|---|---|---|---|
| 1,826,943 | 7/1928 | Maker | 15/110 |
| 2,115,405 | 10/1936 | Allen | 15/110 |
| 4,053,959 | 10/1977 | Wiley | 15/110 |
| 4,211,330 | 7/1980 | Strock | 15/110 |
| 4,346,493 | 8/1982 | Goudsmit | 15/167.1 |
| 4,748,709 | 7/1988 | Oates | 128/62 A |
| 4,831,676 | 5/1989 | Denmark | 15/167.1 |

FOREIGN PATENT DOCUMENTS 248766B 2/1982 France .

Primary Examiner—Thurman K. Page
Assistant Examiner—Donald R. McPhail

[57] ABSTRACT

The small animal prophylactic dentifrice is a foam figure 10 jacketed by a minimally fine threaded netting 14 which, in concert with a flavor attractant, both encourages and results in positive dental care results for small animals.

1 Claim, 2 Drawing Sheets

SMALL ANIMAL PROPHYLACTIC DENTIFRICE

BACKGROUND

1. Field of Invention

Prehistorically, the diet roughage of small animals tended to brush their teeth adequately. In today's society, while some owners attempt to brush their pet's teeth as humans brush, the teeth of domesticated small animals are generally without care.

2. Prior Art

This offerer knows of no prior art addressing this subject, save the rather difficult, for both pet and owner, attempts at brushing their teeth as though they were humans. Some owners approach the problem by utilizing such store-bought items as a prepared "bone" or chewable rawhide, but for the most part, no improvement in dental condition ever occurs. Tartar-like deposits tend to adhere, in general, permanently for the pet's entire existence.

Another negative aspect of this dental condition is the fact that allows the existence of a naturally occurring breeding ground for infectious germs of all sorts. Humans, especially children, tend to receive playful and sometimes serious bites and through punctures of their skin are exposed to disease.

OBJECTS AND ADVANTAGES

Subject invention addresses the problem of preventive dental care in small animals. Invention achieves the same result as actual human being care. Actually it is reported that the use of standard drug store toothpaste has a sickening effect on some animals such as dogs.

Simple to manufacture, invention removes and prevents tartar and other deposits through the frictional effect of the threading after repetitive utilization. Starting out as a desirable "treat", use precludes initial formation of such deposits in young animals. Also prevented is the removal of breeding conditions for disease bacteria.

STRUCTURE OF INVENTION

Figure 1:
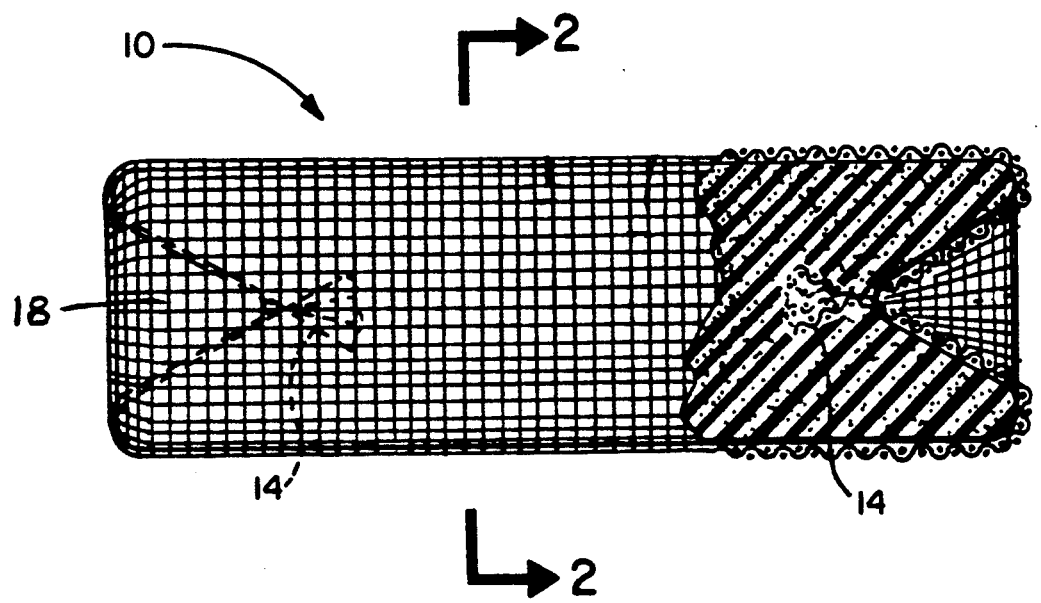
FIG. 1—Shows cylindrical version ("Bone—"Hot Dog")
   10—Foamed insert
   14—Web/Net outer covering or jacket
   18—Heat/crimped sealed ends
FIG. 2 —Shows cross-section of cylindrical version
FIG. 3—Shows flat version ("Bread Slice")
   10—foamed insert
   14—Web/net outer covering or jacket
   18—Heat/crimped seal end/edges
FIG. 4—Shows cross-section of flat version
FIG. 5—Typical tooth flossing
   A—Tooth enters Web/Net
   B—Tooth depresses foam, thread encompasses tooth
   C—Thread slides up tooth shaft to gumline.
Figure 2:
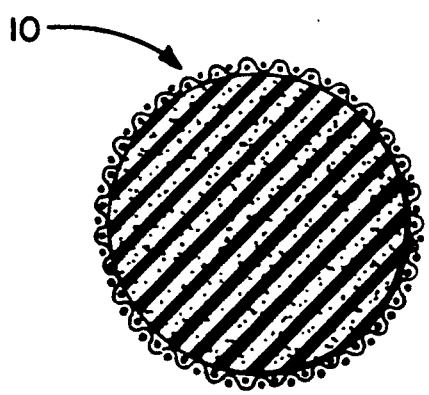
Figure 3:
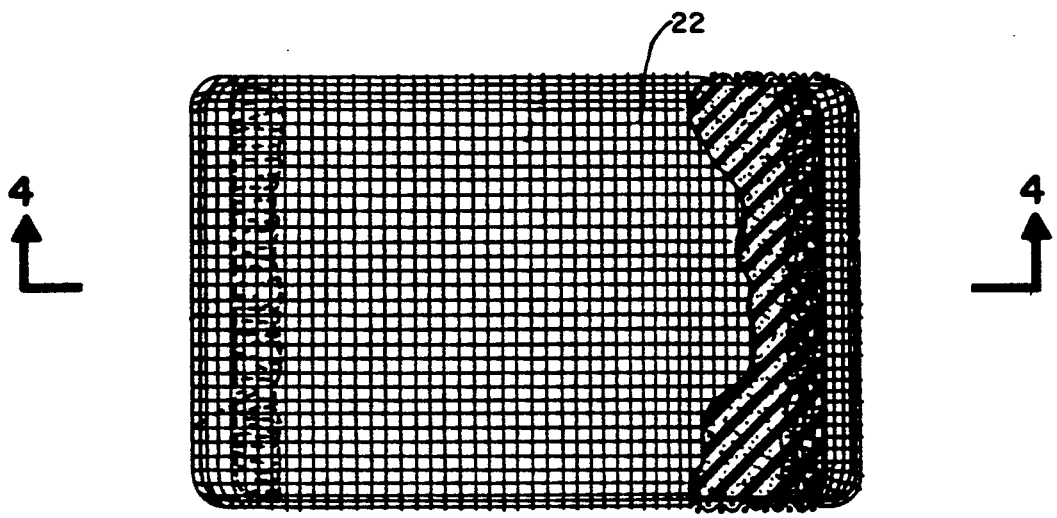
Figure 4:
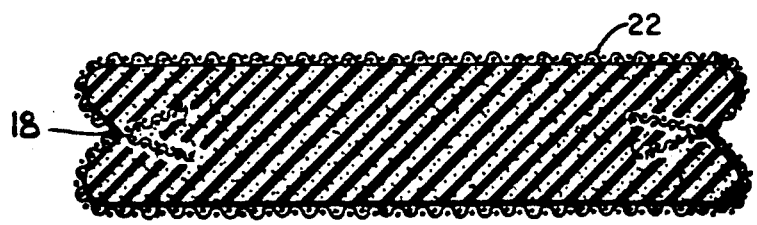
Figures 5A, 5B, 5C:
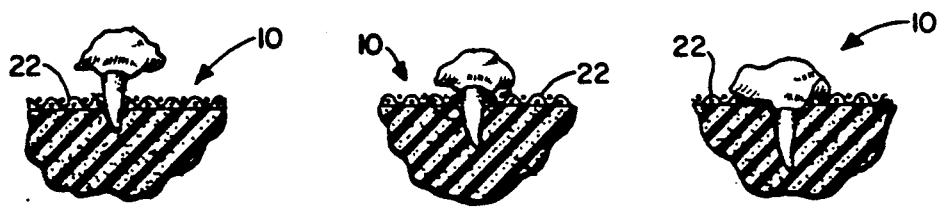

One component of subject invention is the foam portion 10 in the shape of a cylinder (approximately 5 centimeters in diameter and 15 centimeters in length)("bone" or "hot dog") FIG. 1 or relatively wide and flat (15 cm×10 cm×4 cm)("bread slice") FIG. 3. The other component is a covering or jacket 14 to totally and tightly encompass foam portion 10 and is woven of a Kelvar-like threading.

Foam 10 is of the open cell, fine bubbled type capable of saturation and impregnation with water-soluble (like "beef" and catnip) "flavors" (including attractant/smell qualities) which are available in foil packets. Material is extremely tough and durable, impossible to fragment and be swallowed in pieces.

Net/Web 14 is a uniformly woven fabric of minimally-thin, Kelvar-like, pliable threading which totally and tightly encompasses foam component like a container or jacket. Depending on animal size, Net/Web is available woven on centers of 3.1750 mm, 4.7625 mm, 6.3500 mm, or as required. On the cylinder FIG. 1, the ends 18, and on the flat version FIG. 3, all four edges 18, the terminal edges 18 of the fabric are heat-crimped (fused) and "tucked-in" beneath the foam surface so as to preclude any portion of foam surface or any loose fabric to be exposed. Product is available in "Hot" colors for identification (i.e. red/dog, yellow/cat) and for location if lost in yard area.

HOW INVENTION WORKS

Foam component 10 is saturated with water soluble attractant/smell flavor to appease, for example, a cat or a dog. Flavor is in liquid or powder form and is packaged in foil packets. Animal chews on unit and in effect, "brushing" and flossing teeth until flavor is dissipated or for about at least fifteen minutes. As animal chews, the individual teeth pass through Net/Web 14 and are encompassed by woven thread (like Dacron/Nylon/Kevlar) weave, stretching to slide up tooth shaft to gumline. Animal disengages thread from between teeth by pulling head away while holding unit down with paw. Weave 14 elastically returns to original form. Formulated composition of foam 10 substance of maximum durability is such to maintain an unyielding overall surface, holding Web/Net taut. Foam 10 depresses only in the precise, immediate point where tooth enters mesh. Units to be available in "throw-away" six-packs and upon being chewed up, is discarded. Wider shaped figures ("bread slice" FIG. 3) tend to cover a wider area and more teeth than perhaps the more narrow ("bone and hot dog") which tend to chewed on the back teeth.

CONCLUSION

In order to expect optimum performance from this unit, the selection of material formulation was maximized for both the shaped foam media and the webbing/netting encompassing it. Offerer feels the previous description represents the optimum embodiment of the article, but would not limit the basic concept to only that. Following lengthy experimentation, implementation of a mild dental abrasive inclusive with the surface of the foam component would greatly enhance the end result desired. The threads are "held" in place by the foam to facilitate the desired contact with the teeth. The attractant/smell flavor additive creates a positive association with the process by the animal.

I claim:

1. A two-element, small animal chewable, prophylactic cleansing article in rectangular and cylindrical shapes of an orally-accomodative length, by a width of 50% of said length, and a thickness of 20% of said length, or, approximately 4.0×2.0×0.75 inches to 10.0×5.0×2.0 inches, comprised of a uniformly finebubbled, compressibly resilient, open-celled, soluable-attractant flavored, plastisized, non-disentegrating, nondestructable, sponge dentifrice-impregnated foam; tightly jacketed in a netting envelope of elastomeric tooth-flossing threading formulated from derivatives of aramid fibers and diametrally measuring approximately 0.001 to 0.010 inches, thermally crimp-sealed at edge faces, and providing a plurality of random, elastic tooth aperatures measuring from approximately 0.10 to 0.40 inches.

* * * * *